United States Patent
Yamaura et al.

(10) Patent No.: US 10,964,046 B2
(45) Date of Patent: Mar. 30, 2021

(54) INFORMATION PROCESSING APPARATUS AND NON-TRANSITORY COMPUTER READABLE MEDIUM STORING INFORMATION PROCESSING PROGRAM FOR ESTIMATING FACE ORIENTATION BY USING AN OMNI-DIRECTIONAL CAMERA

(71) Applicant: FUJI XEROX CO., LTD., Tokyo (JP)

(72) Inventors: Yusuke Yamaura, Kanagawa (JP); Yukihiro Tsuboshita, Kanagawa (JP); Takeshi Onishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 16 days.

(21) Appl. No.: 16/161,067

(22) Filed: Oct. 16, 2018

(65) Prior Publication Data
US 2019/0378290 A1    Dec. 12, 2019

(30) Foreign Application Priority Data

Jun. 7, 2018   (JP) .............................. JP2018-109232

(51) Int. Cl.
*G06T 7/80*   (2017.01)
*G06T 7/70*   (2017.01)

(52) U.S. Cl.
CPC ...... *G06T 7/70* (2017.01); *G06T 2207/20081* (2013.01); *G06T 2207/30201* (2013.01)

(58) Field of Classification Search
USPC .................. 382/115–133, 154–165, 168–226, 382/254–312; 396/7–13, 20–29, 51, 153, 396/322–347, 360–386, 433–439
See application file for complete search history.

(56) References Cited

U.S. PATENT DOCUMENTS

| | | | |
|---|---|---|---|
| 2006/0187305 A1* | 8/2006 | Trivedi | G06K 9/00234 348/169 |
| 2006/0255986 A1* | 11/2006 | Takanezawa | G08B 13/196 341/67 |
| 2008/0130961 A1* | 6/2008 | Kinoshita | G06K 9/00281 382/118 |
| 2009/0089235 A1* | 4/2009 | Torii | G06K 9/6282 706/46 |
| 2009/0309878 A1* | 12/2009 | Otani | G06K 9/00208 345/427 |
| 2010/0104266 A1* | 4/2010 | Yashiro | G06K 9/00295 386/201 |

(Continued)

FOREIGN PATENT DOCUMENTS

| | | |
|---|---|---|
| JP | 2000-331190 | 11/2000 |
| JP | 4092059 | 5/2008 |
| JP | 2012-227830 | 11/2012 |

*Primary Examiner* — Marcellus J Augustin
(74) *Attorney, Agent, or Firm* — JCIPRNET

(57) ABSTRACT

An information processing apparatus includes a receiving unit that receives a first image which has been extracted from an image obtained by imaging of an omnidirectional camera, the first image having been obtained by imaging a head of a person and position information indicating a position of the person in the image, a calculation unit that calculates a degree of distortion of the first image from the position information, and a learning unit that performs learning for estimating an orientation of a face of the person by using the calculated degree of distortion and the first image.

6 Claims, 12 Drawing Sheets

(56) References Cited

U.S. PATENT DOCUMENTS

| | | | | |
|---|---|---|---|---|
| 2010/0118205 | A1* | 5/2010 | Sohma | G06T 7/248 |
| | | | | 348/700 |
| 2014/0079299 | A1* | 3/2014 | Sukegawa | G06K 9/00288 |
| | | | | 382/118 |
| 2014/0219519 | A1* | 8/2014 | Yuasa | G06K 9/00255 |
| | | | | 382/118 |
| 2015/0363636 | A1* | 12/2015 | Tate | G06K 9/00295 |
| | | | | 382/103 |

* cited by examiner

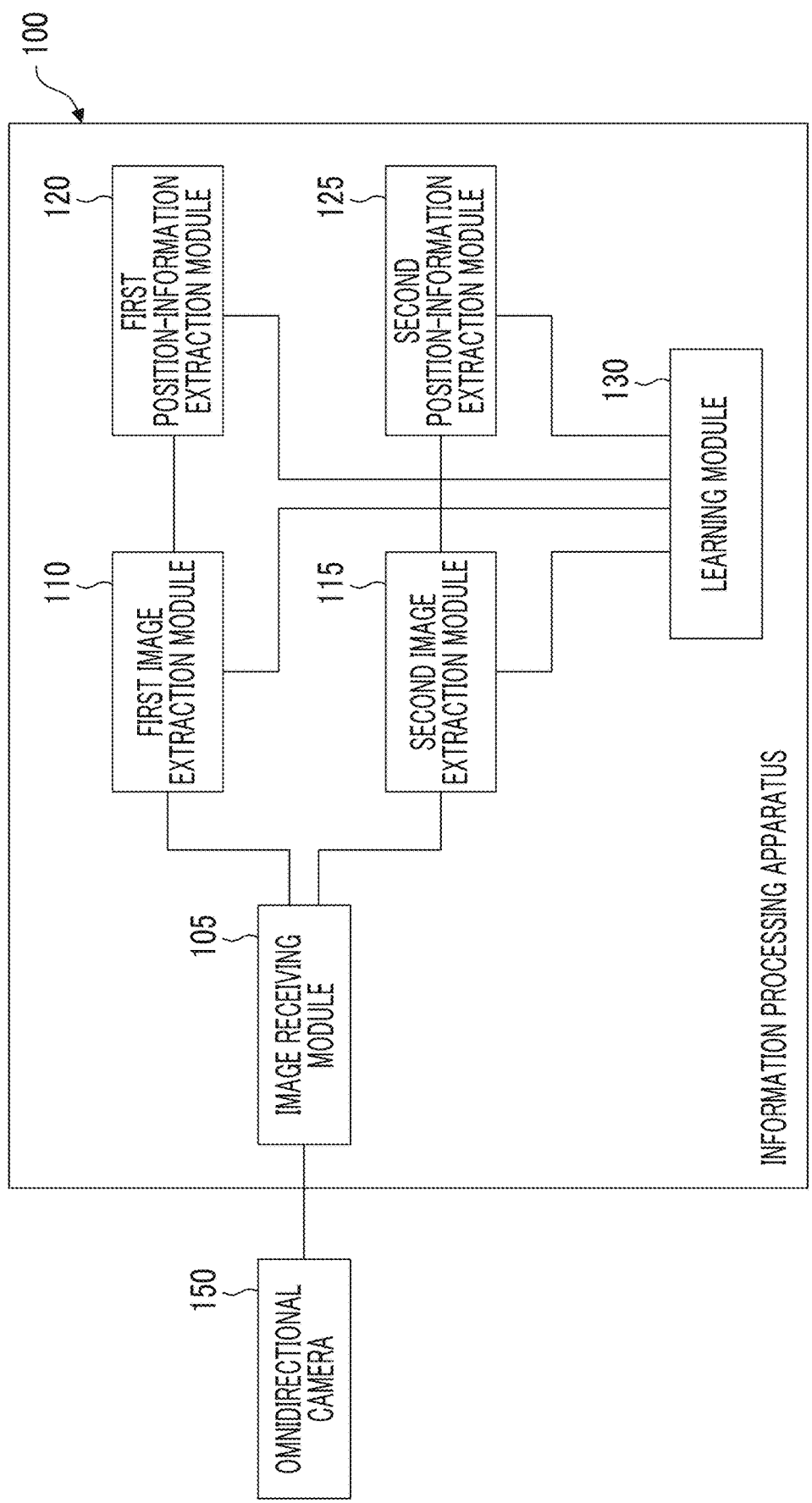

Classification accuracy of each model (%).

|  | AlexNet w/o att. | AlexNet w/ att. | VGGNet w/o att. | VGGNet w/o att. |
|---|---|---|---|---|
| (i) head | 67.9 | 68.2 | 71.3 | 71.3 |
| (ii) body | 64.8 | 65.6 | 72.8 | 75.3 |
| (iii) head + body | 78.3 | 78.6 | 90.5 | 90.5 |

← 900

INFORMATION PROCESSING APPARATUS AND NON-TRANSITORY COMPUTER READABLE MEDIUM STORING INFORMATION PROCESSING PROGRAM FOR ESTIMATING FACE ORIENTATION BY USING AN OMNI-DIRECTIONAL CAMERA

CROSS-REFERENCE TO RELATED APPLICATIONS

This application is based on and claims priority under 35 USC 119 from Japanese Patent Application No. 2018-109232 filed Jun. 7, 2018.

BACKGROUND

(i) Technical Field

The present invention relates to an information processing apparatus and a non-transitory computer readable medium storing an information processing program.

(ii) Related Art

JP2000-331190A discloses the followings. A face region is extracted from a face image obtained by imaging the face of a person. An eye region and a mouth region are extracted based on the center of the face region. Then, at least one of an inclination of a facial axis or a rotation about the facial axis is detected based on the positions of the eye region and the mouth region. The head of a three-dimensional model reproduced in a virtual environment is modified based on the result of the detection, so as to reproduce the movement of the head. In addition, a gaze direction is detected by detecting the position of an iris region of the eye region so as to direct the head of the three-dimensional model in the gaze direction. In the virtual environment, a virtual camera position is on the gaze direction. Further, the background and an object in the virtual environment are reproduced in a form of a three-dimensional model. Thus, an avatar is capable of touching an object in the virtual environment. It is possible to reproduce the movement of the head of a person and the gaze direction of the person in the virtual environment. In addition, it is possible to improve the feeling of a user being put into the virtual environment.

JP4092059B discloses the followings. An object thereof is to provide an image recognition method and a recording medium in which it is possible to reduce the amount of computation for image recognition without impairing estimation accuracy of the orientation of the face. An image recognition device extracts features from each of learning image data in which the orientation of a face is predetermined, and image data of a face as a recognition target, and recognizes the orientation of the face in the image data of the recognition target by using the extracted features. The image recognition device includes a storage unit, a designation unit, and a feature extraction unit. The storage unit stores a first feature. The first feature has been extracted from the learning image data for a specific position of a face, and is the main component vector calculated in a manner that the Gabor wavelet coefficient is extracted from specific positions (first feature for a specific position of a face, which has been previously extracted from the learning image data) of plural pieces of learning image data, an average feature level of people is calculated for each orientation of a face, and main-component analysis of the calculated average feature vector is performed. The designating unit designates a position corresponding to the specific position of image data of the recognition target. The feature extraction unit extracts a second feature from the image data of the recognition target. The second feature is a second feature of the designated position and a feature vector using the Gabor wavelet coefficient extracted from the position corresponding to the specific position of the image data of the recognition target. The orientation of the face of the recognition target is estimated by a projection coefficient obtained in a manner that the second feature extracted from the feature extraction unit is projected to the main component vector which is the first feature stored in the storage unit.

JP2012-227830A discloses the followings. An object thereof is to provide a technology in which, when a line of sight is detected, the line of sight is detected with high accuracy considering the orientation of the line of sight on an image and a positional relationship between an imaging device and a face. An information processing apparatus includes an image acquisition unit, a face detection unit, a sight line detection unit, an acquisition unit, and a determination unit. The image acquisition unit acquires an image input through an imaging optical system. The face detection unit detects the face of a person from the image. The sight line detection unit detects the line of sight of the face. The acquisition unit acquires information indicating a positional relationship between the person and the imaging optical system. The determination unit determines whether or not the detected line of sight is directed in a predetermined direction, based on the information indicating the positional relationship.

SUMMARY

Learning of a direction in which the face of a person is directed by using a face image of the person, which is obtained by imaging parts of the face such as eyes and the mouth is performed. However, regarding an image obtained by imaging of an omnidirectional camera, only a top of the head may be imaged by a positional relationship between the omnidirectional camera and the person. That is, since the part corresponding to the face of a person is not imaged, learning the direction of the face of the person may have difficulty.

Aspects of non-limiting embodiments of the present disclosure relate to an information processing apparatus and a non-transitory computer readable medium storing an information processing program in which it is possible to perform learning for estimating the orientation of the imaged face of a person by using an image obtained by imaging of an omnidirectional camera, as a target.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus which includes a receiving unit that receives a first image which has been extracted from an image obtained by imaging of an omnidirectional camera, the first image having been obtained by imaging a head of a person and position information indicating a position of the person in the image, a calculation unit that calculates a degree of distortion of the first image from the position information, and a learning unit that performs learning for estimating an orientation of a face of the person by using the calculated degree of distortion and the first image.

BRIEF DESCRIPTION OF THE DRAWINGS

Exemplary embodiment(s) of the present invention will be described in detail based on the following figures, wherein:

FIG. 1 is a diagram conceptually illustrating a module configuration of a configuration example according to an exemplary embodiment;

DETAILED DESCRIPTION

Figure 2B:
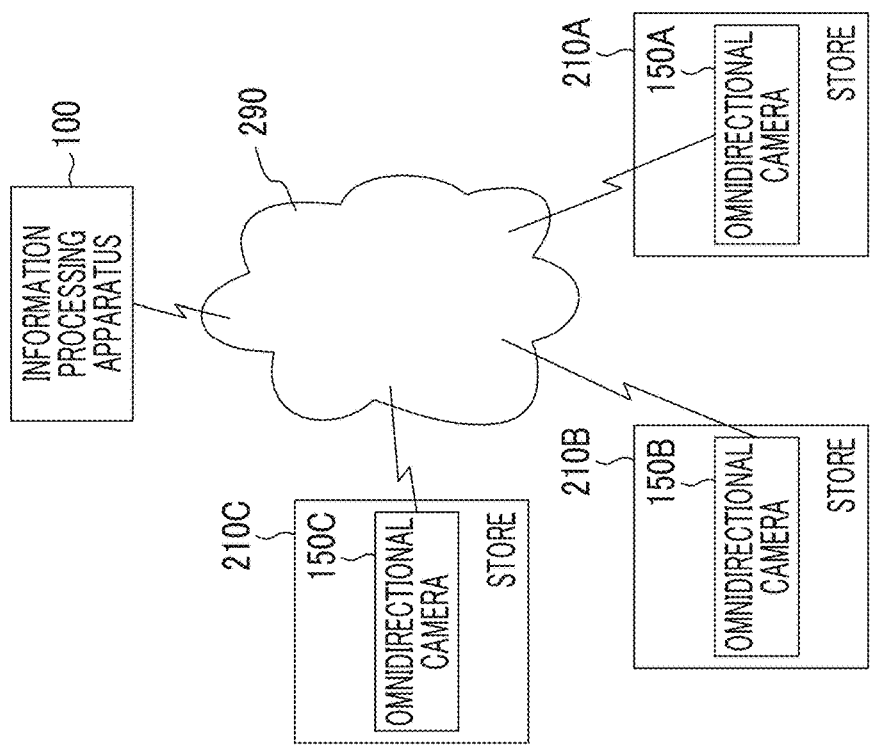
FIGS. 2A and 2B are diagrams illustrating a system configuration example using the exemplary embodiment.

Hereinafter, an example of an exemplary embodiment for embodying the present invention will be described with reference to the drawings.

FIG. 1 is a diagram conceptually illustrating a module configuration of a configuration example according to the exemplary embodiment.

The module means components of software (computer program) or hardware, which are generally and logically separable from each other. Thus, the module in the exemplary embodiment means a module in a hardware configuration, in addition to a module in a computer program. In the exemplary embodiment, a computer program (program for causing a computer to perform procedures, program for causing a computer to function as means, program for causing a computer to realize functions), a system, and a method for being caused to function as modules will be described together. For easy descriptions, "storing", "being stored", and phrases equivalent to those are used. However, these phrases mean being stored in a storage device or performing control to be stored in a storage device, in a case where the exemplary embodiment is embodied in a form of a computer program. The module may correspond to a function one by one. In practice, one module may be configured by one program, or plural modules may be configured by one program. Reversely, one module may be configured by plural programs. The plural modules may be performed by one computer. One module may be performed by plural computers in a distributed or parallel environment. One module may include another module. In the following descriptions, "connection" is used in a case of a logical connection (exchange of data, instruction, reference relationship between pieces of data, log-in, and the like) in addition to a case of a physical connection. The phrase of "being predetermined" means being determined before target processing. This phrase is used with including the meaning of being determined before processing according to the exemplary embodiment starts, and the meaning of being determined in accordance with a situation or a state at that time or with a situation or a state until that time so long as that time is before the target processing even after the processing according to the exemplary embodiment has started. In a case where plural "predetermined values" are provided, the values may be different from each other, or two values or more (also including all values) may be equal to each other. The description of "setting B in a case of A" is used with the meaning of "determining whether or not to be A and setting B in a case where it is determined to be A". However, a case where the determination of whether or not to be A is not required is excluded. In a case of enumerating things, for example, like "A, B, C", it is an example enumeration unless otherwise noted and includes cases where only one of them is selected (for example, only A).

The system or the device is configured in a manner that plural computers, plural pieces of hardware, plural devices, and the like are connected to each other by communication means (including one-to-one corresponding communication connection), and may be realized by one computer, one piece of hardware, one device, or the like. "The device" and "the system" are used as terms having the same meanings. "The system" does not include just a social "mechanism" (social system) which is an artificial arrangement.

For each processing by each module, or for each processing in a case where plural pieces of processing are performed in the module, information as a target is read from a storage device. After the processing has been performed, a result of the processing is written in the storage device. However, regarding reading from a storage device before processing and writing in the storage device after the processing, descriptions may be omitted. Here, the storage device may store a hard disk, a random access memory (RAM), an external storage medium, a storage device through a communication line, a register in a central processing unit (CPU), and the like.

An information processing apparatus 100 according to the exemplary embodiment performs mechanical learning (simply referred to as learning below) for estimating an orientation of the face of a person, which has been obtained by imaging of an omnidirectional camera 150. As illustrated in an example in FIG. 1, the information processing apparatus 100 includes an image receiving module 105, a first image extraction module 110, a second image extraction module 115, a first position-information extraction module 120, a second position-information extraction module 125, and a learning module 130.

The omnidirectional camera 150 capable of performing imaging by 360 degrees with one camera is used. Regarding an omnidirectional camera image, an appearance or strength of distortion changes in accordance with a distance (position at which a person is photographed) between the camera and the person. A state where the face is hidden and thus only the top of the head is seen occurs, in particular, in a case where a person is in the vicinity of a region just under the camera.

Generally, two approaches for a method of estimating a facial orientation based on a head image are provided. One is a method of estimating the orientation of a face based on a positional relationship of parts of the face. This method assumes being imaged from the front. Thus, it is not possible to apply this method to a case where the face is hidden. The other is a method of extracting the feature amount from a head image and estimating the orientation of a face by mechanical learning. With this method, it is not possible to estimate the orientation of the face even with the human eyes, only by the top of the head. Thus, it is not possible to extract the effective feature amount and estimation fails. The omnidirectional camera has an imaging range wider than that of a general camera. Thus, the number of cameras to be installed is reduced and cost is reduced. However, a facial orientation estimation method considering application of the omnidirectional camera is not provided.

In the exemplary embodiment, it is possible to estimate the orientation of a face even in a state where the face is hidden and only the top of the head is seen. The orientation of the face is estimated considering an appearance or strength of distortion, which changes in accordance with the distance between the omnidirectional camera and the person.

Therefore, in the exemplary embodiment, it is possible to estimate the orientation of a face based on the orientation of a body even though the face is hidden, by inputting not only a head image but also a whole body image to mechanical learning. For example, it is possible to learn a relationship between the distance between a camera and a person and an appearance or strength of distortion, which changes in accordance with the distance between the omnidirectional camera and a person, by inputting attribute information of the head image and the whole body image.

The omnidirectional camera 150 (including a camera called as a whole celestial camera) is connected to the image receiving module 105 of the information processing apparatus 100. The omnidirectional camera 150 is a camera capable of performing imaging with one camera, by 360 degrees. For example, a dome type camera equipped with plural fisheye lenses having a super wide angle is provided. The omnidirectional camera 150 may be a camera that images a still image or a camera that images a motion image.

The image receiving module 105 is connected to the omnidirectional camera 150, the first image extraction module 110, and the second image extraction module 115. The image receiving module 105 receives an image (also referred to as "an omnidirectional camera image" below) obtained by imaging of the omnidirectional camera 150. The image receiving module 105 and the omnidirectional camera 150 may communicate with each other in a wireless or wired manner, or in a combination thereof.

The image receiving module 105 transfers the received image to the first image extraction module 110 and the second image extraction module 115.

The first image extraction module 110 is connected to the image receiving module 105, the first position-information extraction module 120, and the learning module 130. The first image extraction module 110 extracts an image (first image) obtained by imaging of the head of a person, from the image obtained by imaging of the omnidirectional camera 150. A technology in the related art may be used as a technology of extracting the first image. For example, a technology of detecting a body may be used.

The first position-information extraction module 120 is connected to the first image extraction module 110 and the learning module 130. The first position-information extraction module 120 extracts position information indicating the position of a person in the omnidirectional camera image, by using the position of the first image extracted by the first image extraction module 110. The position itself of the first image may be used as the position of the person. Here, "the position information" includes an coordinate position of the person which is defined based on the center of omnidirectional camera image, a distance from the center of omnidirectional camera image to the person, or a combination thereof. "The position information" may further include the size of the person, a ratio between a horizontal length and a vertical length of a rectangle surrounding the person, or a combination thereof. Further, "the position information" may additionally include an angle (for example, 90 degrees (orientation (90°) 704 of a face in an example in FIG. 7 which will be described later)) in an omnidirectional camera image, or may additionally include XY coordinates in the imaged background.

The second image extraction module 115 is connected to the image receiving module 105, the second position-information extraction module 125, and the learning module 130. The second image extraction module 115 extracts an image (second image) obtained by at least imaging of parts other than the head of the person, which has been extracted from the image obtained by imaging of the omnidirectional camera 150.

As "the second image", an image obtained by imaging of the whole body of the person in the omnidirectional camera image (in this case, also including the head of the person), an image obtained by imaging of the upper body of the person (in this case, also including the head of the person), an image obtained by imaging of the lower body of the person, an image obtained by imaging of the hand of the person, or combinations thereof may be used. Here, "the hand" refers to any part of the body, which is ahead of the shoulder, for example, a part ahead of an arm or the wrist.

The second position-information extraction module 125 is connected to the second image extraction module 115 and the learning module 130. The second position-information extraction module 125 extracts position information indicating the position of the person in the omnidirectional camera image, by using the position of the second image extracted by the second image extraction module 115, similar to the first position-information extraction module 120. The position itself of the second image may be used as the position of the person. "The position information" has a definition equivalent to the description of the first position-information extraction module 120. The second position-information extraction module 125 may perform processing having details which are equivalent to the details of processing by the first position-information extraction module 120.

The learning module 130 is connected to the first image extraction module 110, the second image extraction module 115, the first position-information extraction module 120, and the second position-information extraction module 125. The learning module 130 receives the first image extracted by the first image extraction module 110 and the position information extracted by the first position-information extraction module 120. The learning module 130 calculates the degree of distortion of the first image from the position information, and then performs learning for estimating the orientation of the face of the person by using the calculated degree of distortion and the first image.

Here, "the orientation of the face of the person" may mean a direction in a case where the face has been moved in a lateral direction, a direction in a case where the face has been moved in a vertical direction, or a combination thereof.

Figure 11A:
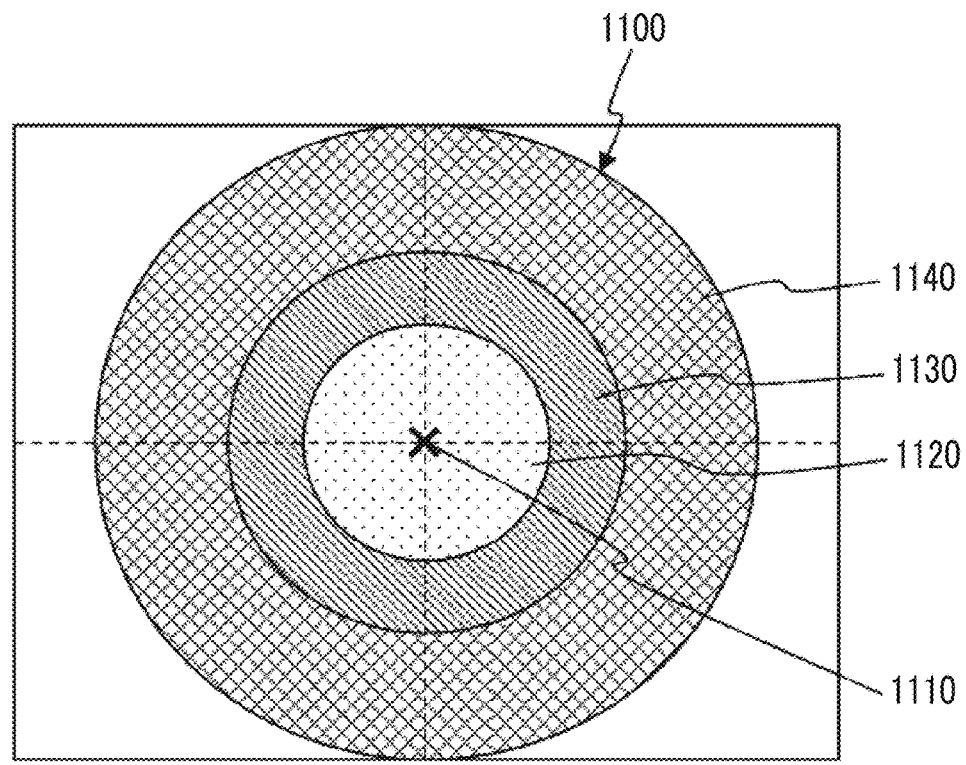
FIGS. 11A to 11C are diagrams illustrating examples in which the omnidirectional camera image is divided into plural regions.

(1) "The degree of distortion of the first image" means, for example, a value determined depending on the distance from the center of the omnidirectional camera image. The degree of distortion at the center (distance from the center is 0) is small (for example, the degree of distortion is 0). As the person is at a distance farther from the center, the degree of distortion increases. Specifically, the degree of distortion may be proportional to the distance from the center or may be calculated by a calculation formula having characteristics (in particular, characteristics of the lens) of the omnidirectional camera 150 and a distance from the omnidirectional camera 150 to a target (target imaged in the omnidirectional camera image), as variables. Here, the distance may be a continuous value or may be a discrete value. In a case of being a discrete value, the degree of distortion is determined for each so-called region. As the shape of the region, for example, a donut-like shape (cylindrical shape) which will be described later with reference to FIG. 11A is provided.

Figure 11B:
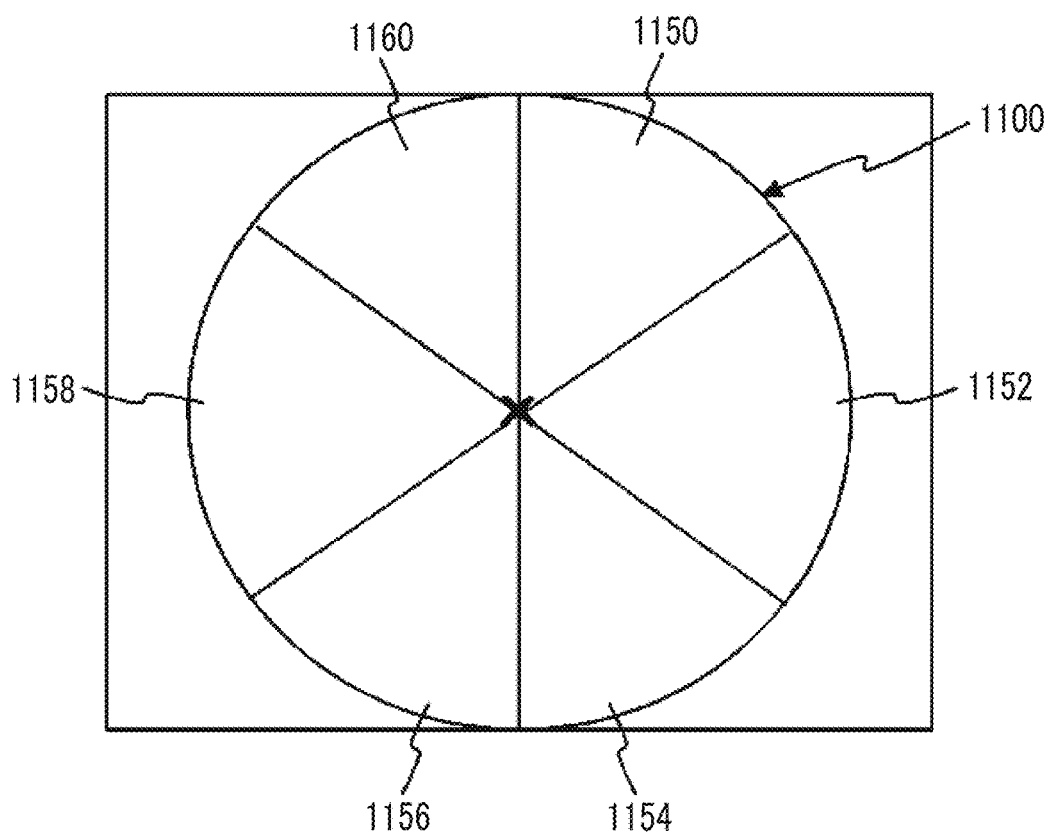
Figure 11C:
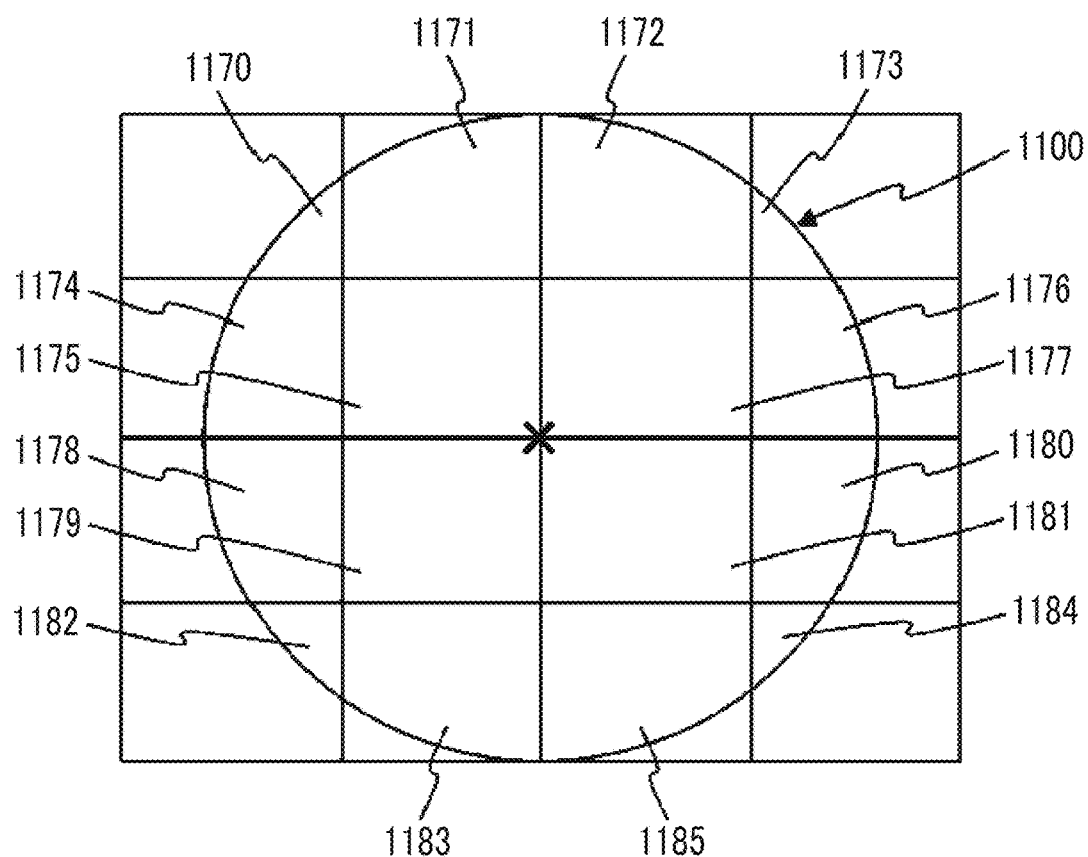

(2) "The degree of distortion of the first image" means, for example, a value determined depending on the position in the omnidirectional camera image. The degree of distortion at a position close to the center is small (for example, the degree of distortion is 0). As the person is at a position farther from the center, the degree of distortion increases. The degree of distortion may be predetermined for each position. Here, the position may be a continuous value or may be a discrete value. In a case of being a discrete value, the degree of distortion is determined for each so-called region. As the shape of the region, for example, a fan-like shape and a rectangular which will be described later with reference to FIGS. 11B and 11C are provided.

"Learning for estimating the orientation of the face of a person by using the degree of distortion and the first image" may mean, for example, that (1) learning for estimating the orientation of the face of a person by using the degree of distortion and the first image as learning parameters, that (2) learning using the first image is performed for each degree of distortion, that (3) learning using the first image is performed for each distance from the center, and that (4) learning using the first image is performed for each position. In (3) and (4), "each distance from the center" and "each position" may be performed for each region. The reason is as follows. In a case where the degree of distortion is different between "each distance from the center" and "each position", and learning is performed for each of these cases, it is possible to increase a recognition rate of the orientation of the face of a person in the first image "for each distance from the center" or "for each position", in comparison to a case where learning is performed with the entirety of the omnidirectional camera image.

The learning module 130 may receive the second image extracted by the second image extraction module 115 and the position information extracted by the second position-information extraction module 125, and perform learning for estimating the orientation of the face of a person by using the second image and the position information.

The learning module 130 may receive the first image extracted by the first image extraction module 110, the second image extracted by the second image extraction module 115, and the position information extracted by the first position-information extraction module 120 or the second position-information extraction module 125, and perform learning for estimating the orientation of the face of a person by using the first image, the second image, and the position information.

The learning module 130 may perform learning for estimating the orientation of a person in addition to the orientation of the face of the person. Here, "the orientation of a person" means the orientation of the entirety of the body, the orientation of a foot, and the like. The orientation of a person is identical to the orientation of the face of the person in many cases, but may be different. A case of being different corresponds to, for example, a case where the entirety of the body is directed forward, but the face is directed laterally.

The learning module 130 may further receive third position information indicating the position of an object other than a person, in the omnidirectional camera image, and perform learning for estimating the orientation of the face of the person by using the third position information. Here, "the object other than a person" means a product shelf, a product, a poster, a mannequin, a person (for example, clerk) other than the target person, or a combination thereof.

In a case where the size of a first image or a second image is equal to or smaller than the predetermined threshold, the learning module 130 may not use the first image or the second image for learning. Here, the threshold may change in accordance with the distance from the center of the omnidirectional camera image. Here, regarding "changing in accordance with the distance from the center of the omnidirectional camera image", specifically, in a case where a target is close to the center, the threshold may have a large value. In a case where the target is far from the center, the threshold may have a small value.

The learning module 130 may determine whether or not to use the second image, in accordance with the distance from the center of the omnidirectional camera image. The weights of the first image and the second image may be determined in accordance with the distance from the center of the omnidirectional camera image.

Omnidirectional camera images may be time-series images. Here, "the time-series images" may mean still images which have been obtained by imaging of the same place and have different imaging time points or may mean still images (frame images) extracted from a motion image. In this case, the learning module 130 may further receive motion information indicating the movement of the person, which has been extracted by comparison to a first image or a second image which has been imaged before the first image or the second image as the target. A comparison target is a combination of "the target first image and a first image imaged before the target first image", or a combination of "target second image and a second image imaged before the target second image". The learning module 130 may perform learning for estimating the orientation of the face of the person further by using the motion information. As "the motion information", a speed, an acceleration, a movement vector, a movement trajectory, or a movement distance of the person, or a combination thereof may be used.

Figure 2A:
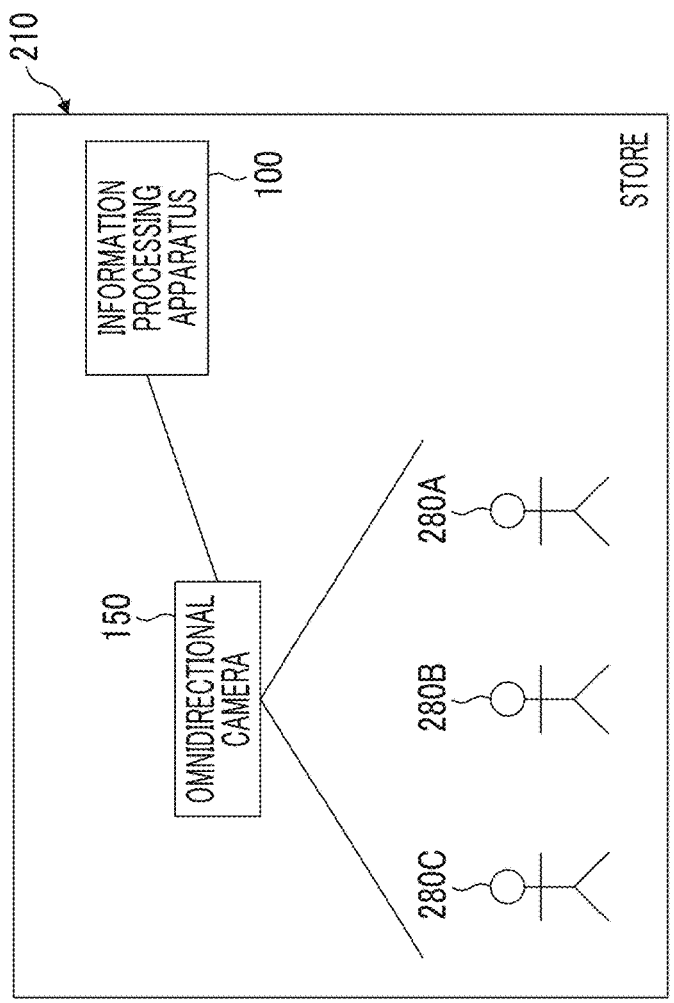

FIGS. 2A and 2B are diagrams illustrating a system configuration example using the exemplary embodiment.

FIG. 2A illustrates an example in a case where learning is performed for each store, and illustrates a system configuration example in a case where an omnidirectional camera 150 is installed on the ceiling of a store 210, persons 280A, 280B, and 280C as customers entering into the store 210 are imaged, and an information processing apparatus 100 performs learning. The information processing apparatus 100 may estimate the orientation of the face of, for example, the person 280A as the customer, by using a model after learning (data after learning). Here, "the orientation of the face" indicates a position of a product, a poster, or the like in the store 210, and it is possible to grasp a prominent (eye-catching) product or the like.

FIG. 2B illustrates an example in a case where learning is performed by using omnidirectional camera images obtained in plural stores. The information processing apparatus 100, an omnidirectional camera 150A in a store 210A, an omnidirectional camera 150B in a store 210B, and an omnidirectional camera 150C in a store 210C are connected to each other via a communication line 290. The communication line 290 may be wired, wireless, or in combination thereof. For example, the Internet, an intranet, and the like as a communication infrastructure may be provided as the communication line. A function performed by the information processing apparatus 100 may be realized as a cloud service.

FIGS. 2A and 2B are diagrams illustrating an example in which the omnidirectional camera 150 is installed in the store 210. However, the omnidirectional camera may be installed at another place. For example, the omnidirectional camera may be installed in a station, a classroom, an art museum, and the like.

Figure 3:
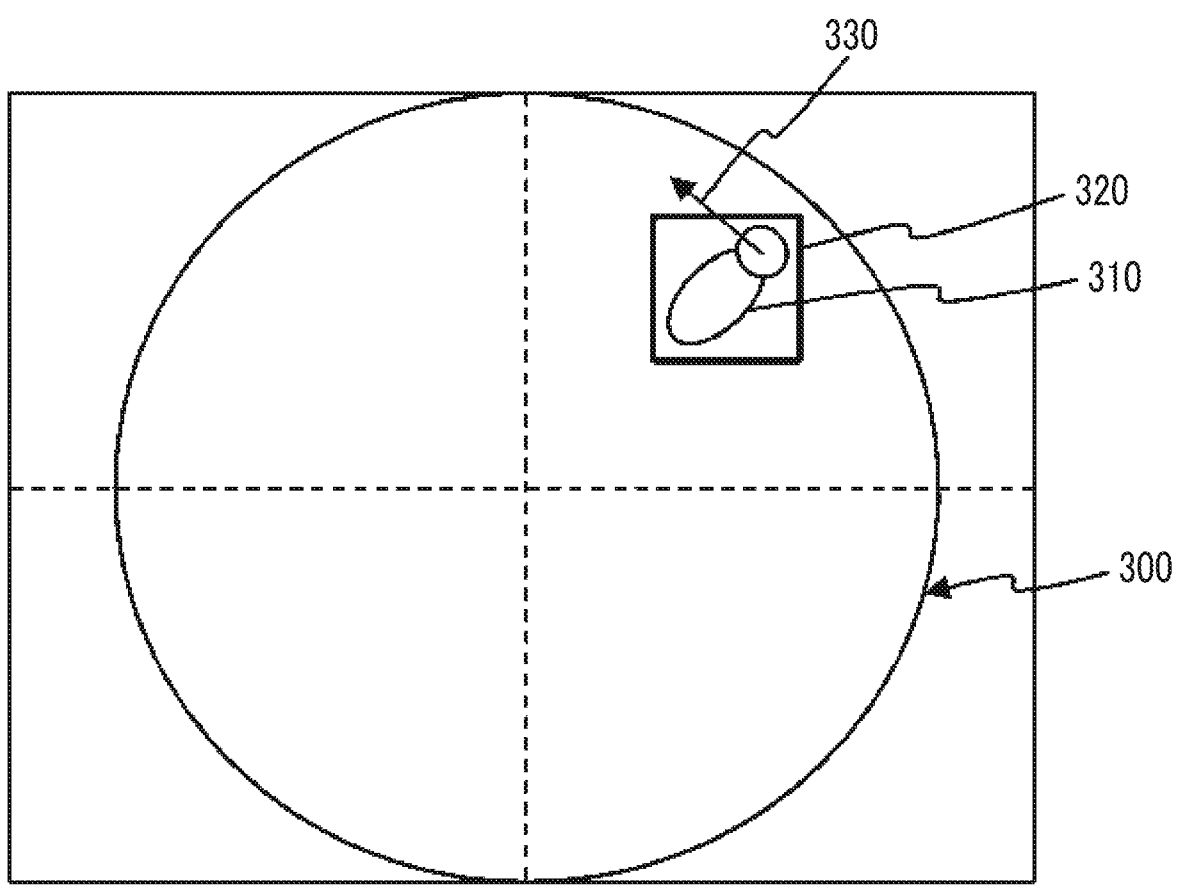
FIG. 3 is a diagram illustrating an example of an image obtained by an omnidirectional camera imaging a person.

FIG. 3 is a diagram illustrating an example of an image obtained by the omnidirectional camera 150 imaging a person.

An omnidirectional camera image 300 is an image obtained by imaging of the omnidirectional camera 150. In a case where a person comes into an imaging range of the omnidirectional camera 150, a person image 310 is imaged in an omnidirectional camera image 300. A circumscribed rectangle 320 indicates an image (example of second image) surrounding the person image 310. In the example in FIG. 3, the circumscribed rectangle 320 is a rectangle surrounding the whole body of the person image 310. An example of the first image is an image in a rectangle surrounding the head in the person image 310.

The information processing apparatus 100 learns an orientation 330 of the face of the person image 310. It is possible to estimate the orientation 330 of the face of the person image 310 by a model generated as a learning result.

Figure 4A:
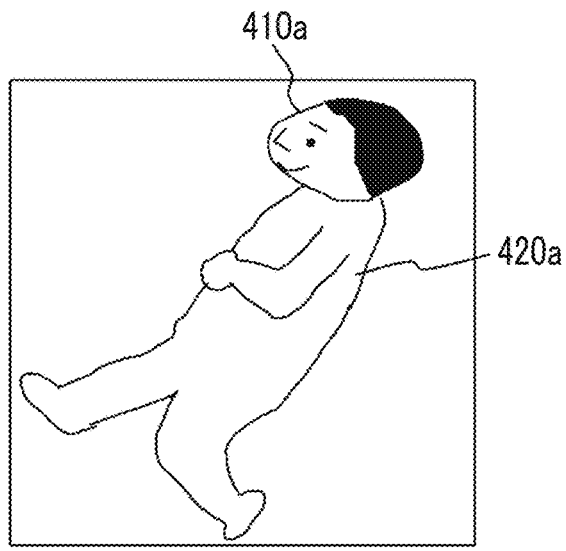
FIGS. 4A to 4C are diagrams illustrating examples of the image obtained by the omnidirectional camera imaging the person.
Figure 4B:
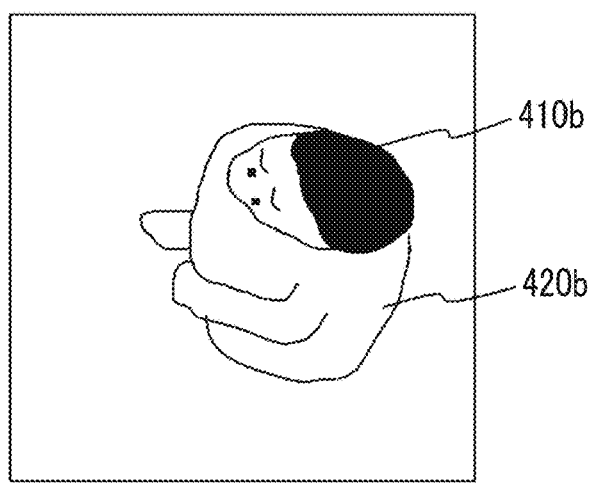
Figure 4C:
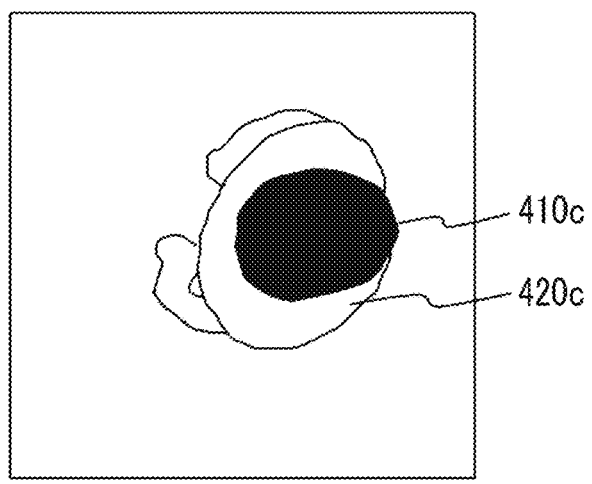

FIGS. 4A to 4C are diagrams illustrating examples of the image obtained by the omnidirectional camera 150 imaging the person.

FIG. 4A illustrates an example of a whole body image 420a obtained by imaging at a periphery (outside) in the omnidirectional camera image 300. A head image 410a is imaged, and most of the organs (eyes, mouth, nose, eyebrows, hair, and the like) in the face are imaged. Just the head image 410a may be used in learning for estimating the orientation of the face by the technology in the related art.

FIG. 4B illustrates an example of a whole body image 420b obtained by imaging at a periphery (outside) in the omnidirectional camera image 300. A head image 410b is imaged, and some organs (for example, mouth) in the face are not imaged. Thus, learning for estimating the orientation of the face has difficulty with using only the head image 410b (estimation accuracy is low).

FIG. 4C illustrates an example of a whole body image 420c obtained by imaging in the vicinity of the center in the omnidirectional camera image 300. A head image 410c is imaged, and the organs in the face are hardly imaged. Thus, learning for estimating the orientation of the face has difficulty with using only the head image 410c. However, even in a case of the image illustrated in FIG. 4C, since the parts (for example, hand) other than the head image 410c are imaged, the imaged parts may be used in learning for estimating the orientation (left direction in this case) of the face.

The information processing apparatus 100 performs learning for estimating the orientation of the face of the person, by using any of a combination of the head image 410 and position information of the person, a combination of the whole body image 420 and the position information of the person, and a combination of the head image 410, the whole body image 420, and position information of the person. In the following descriptions, an example using the combination of the head image 410, the whole body image 420, and the position information of the person will be described.

Figure 5:
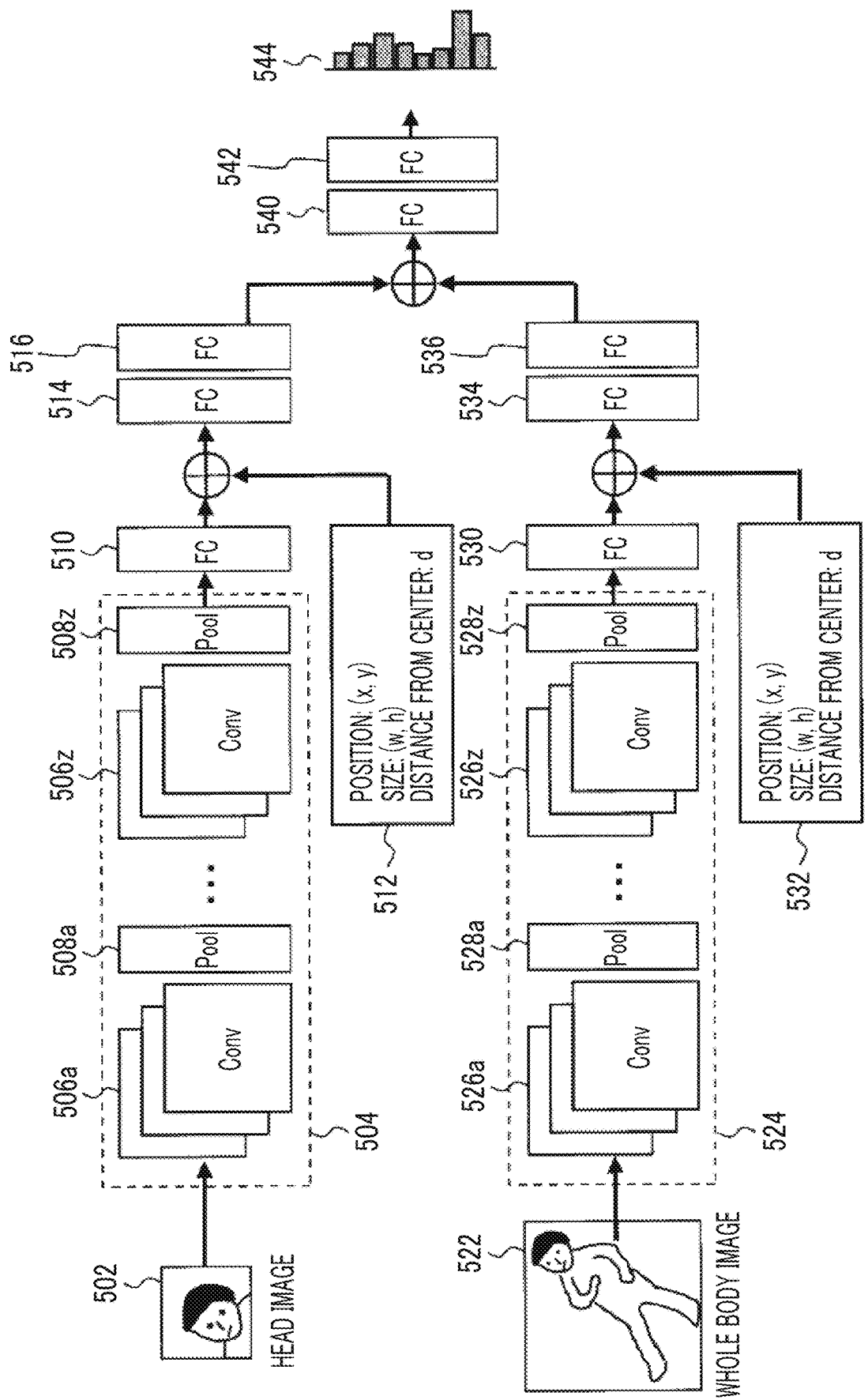
FIG. 5 is a diagram conceptually illustrating a module configuration in a case where learning is performed by using a head image and a whole body image.

FIG. 5 is a diagram conceptually illustrating a module configuration in a case where learning is performed by using a head image 502 and a whole body image 522. FIG. 5 illustrates an example of a configuration in the learning module 130.

For example, the learning module 130 extracts features of an image by convolutional neural networks (CNN).

The head image 502, the whole body image 522, position information of the head, position information of the whole body (position, size, or distance from the center in an omnidirectional camera image, in FIG. 5, position information 512 and position information 532) are input. The first image extraction module 110 extracts an image (head image 502) of a head region, and the second image extraction module 115 extracts an image (whole body image 522) of a whole body region. The first position-information extraction module 120 extracts the position information (position information 512) of the head region, and the second position-information extraction module 125 extracts the position information (position information 532) of the whole body region.

Discrete eight directions in a direction of shaking the neck sideways are provided as an output (so-called 8-class classification problem).

Specifically, processing as follows is performed.

The head image 502 and the whole body image 522 are extracted from an omnidirectional camera image. The head image 502 is input to a CNN 504, and the whole body image 522 is input to a CNN 524. Plural Conv (convolution layers) 506, and a Pool (pooling layer) 508 are provided in the CNN 504. Similarly, plural Conv 526 and a Pool 528 are provided in the CNN 524.

A processing result of the CNN 504 is input to a full-connected layer (FC) 510. A processing result of the FC 510 and the position information 512 are input to the next FC 514. Then, an FC 516 performs processing. A processing result of the CNN 524 is input to an FC 530. A processing result of the FC 530 and the position information 532 are input to the next FC 534. Then, an FC 536 performs processing.

Processing results of the FC 516 and FC 536 are input to an FC 540, and an FC 542 performs processing. Thus, a classification result 544 is obtained. That is, the classification result 544 indicates a probability of each of the eight directions. The direction having the highest value may be estimated as the orientation of the face of the person.

As teaching data, a set of the head image 502, the whole body image 522, and "information indicating the orientation of the face" is prepared. At time of learning, learning is performed using, for example, an error back propagation method such that the classification result 544 corresponds to "the information indicating the orientation of the face" of the teaching data. Specifically, for example, a gradient descent method may be used for minimizing an error between the classification result 544 and "the information indicating the orientation of the face" of the teaching data.

The position information 512 includes a position (x, y) of the head image 502 in the omnidirectional camera image, the size (w, h) thereof, and a distance (d) from the center. The position information 532 includes a position (x, y) of the whole body image 522 in the omnidirectional camera image, the size (w, h) thereof, and a distance (d) from the center.

Figure 6A:
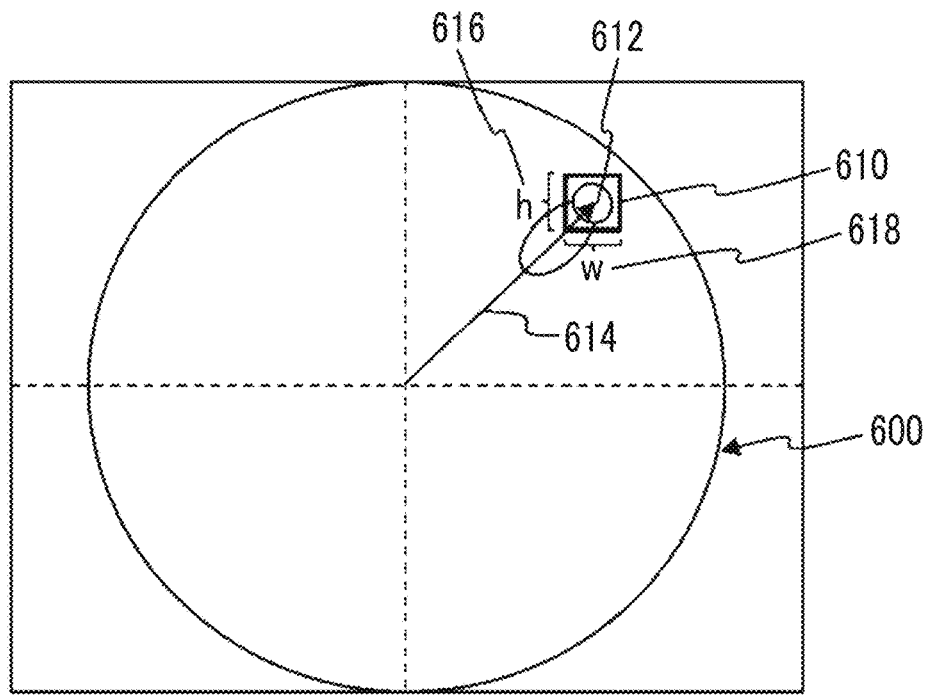
FIGS. 6A and 6B are diagrams illustrating examples of position information of the head image and the whole body image in an omnidirectional camera image.
Figure 6B:
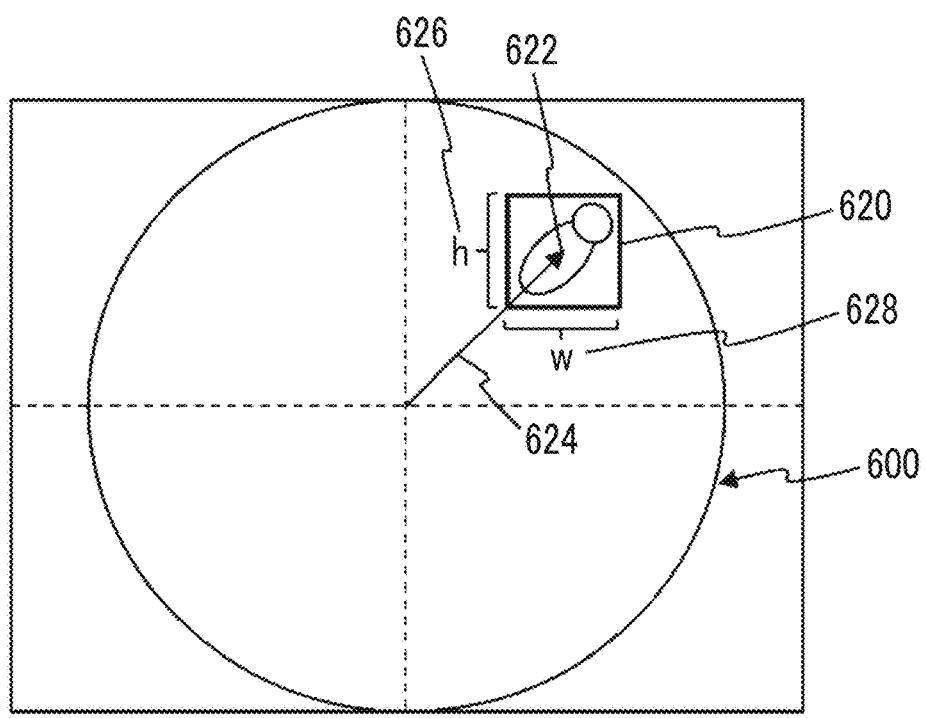

Descriptions will be made with reference to the example in FIGS. 6A and 6B. FIGS. 6A and 6B are diagrams illustrating position information (position parameters) of the head image 610 and the whole body image 620 in the omnidirectional camera image 600. The head image 610 is a rectangular image surrounding the head, and the whole body image 620 is a rectangular image surrounding the whole body.

FIG. 6A illustrates that the center position (x, y) 612 of the head image 610 may be set as the position of a head image 610 in an omnidirectional camera image 600, the width (w) 618 of the head image 610 and the height (h) 616 thereof may be set as the size, and a distance between the center of the omnidirectional camera image 600 and the center position (x, y) 612 of the head image 610 may be set as a distance 614 from the center.

FIG. 6B illustrates that the center position (x, y) 622 of the whole body image 620 may be set as the position of a whole body image 620 in the omnidirectional camera image 600, the width (w) 628 of the whole body image 620 and the height (h) 626 thereof may be set as the size, and a distance between the center of the omnidirectional camera image 600 and the center position (x, y) 622 of the whole body image 620 may be set as a distance 624 from the center.

The positions and the distances from the center in the position information 512 and the position information 532 are information used for learning a change of an appearance and distortion.

Regarding the sizes in the position information 512 and the position information 532, an approximate size is determined by a position at which photographing is performed (position in the omnidirectional camera image), in a case of the omnidirectional camera 150. Thus, for example, even a case where the posture changes (for example, the person crouches down, or the hand is stretched out), or a portion of the body is hidden by an object or a person may be handled in accordance with the aspect ratio of the size.

Figure 7:
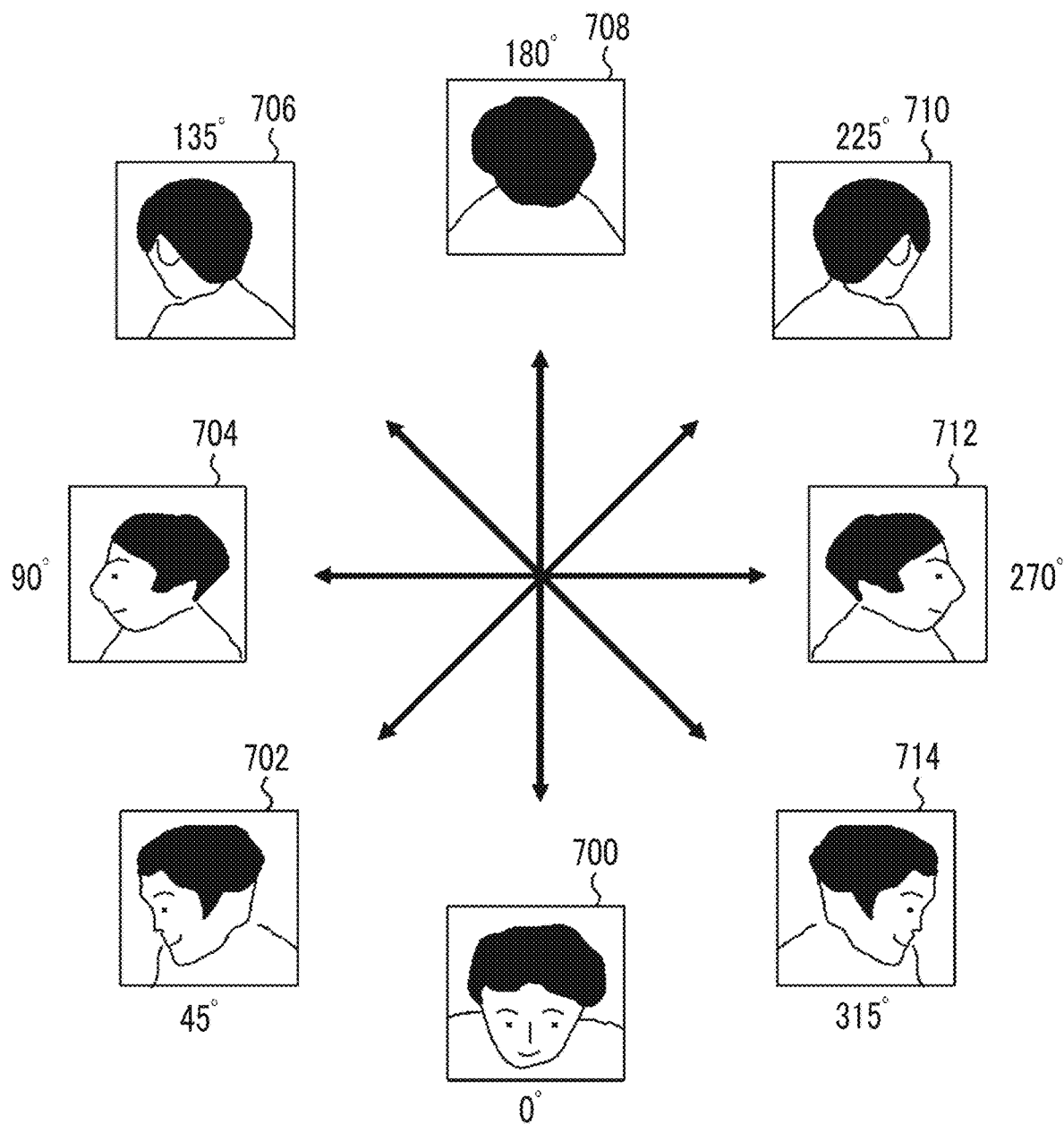
FIG. 7 is a diagram illustrating an example of eight orientations for a face.

FIG. 7 is a diagram illustrating an example of eight orientations of the face. In this exemplary embodiment, eight directions are provided as orientations of the face. As illustrated in the example in FIG. 7, an orientation (0°) 700 of the face, an orientation (45°) 702 of the face, an orientation) (90°) 704 of the face, an orientation (135°) 706 of the face, an orientation (180°) 708 of the face, an orientation (225°) 710 of the face, an orientation (270°) 712 of the face, and an orientation (315°) 714 of the face are provided. In addition to eight directions, four directions, 16 directions, and the like may be provided. As described above, a direction in a case where the face is moved in a lateral direction as illustrated in the example in FIG. 7, a case where the face is moved in a vertical direction (looking-up, looking-down, and the like), or a combination thereof may be provided as a learning target.

Figure 8:
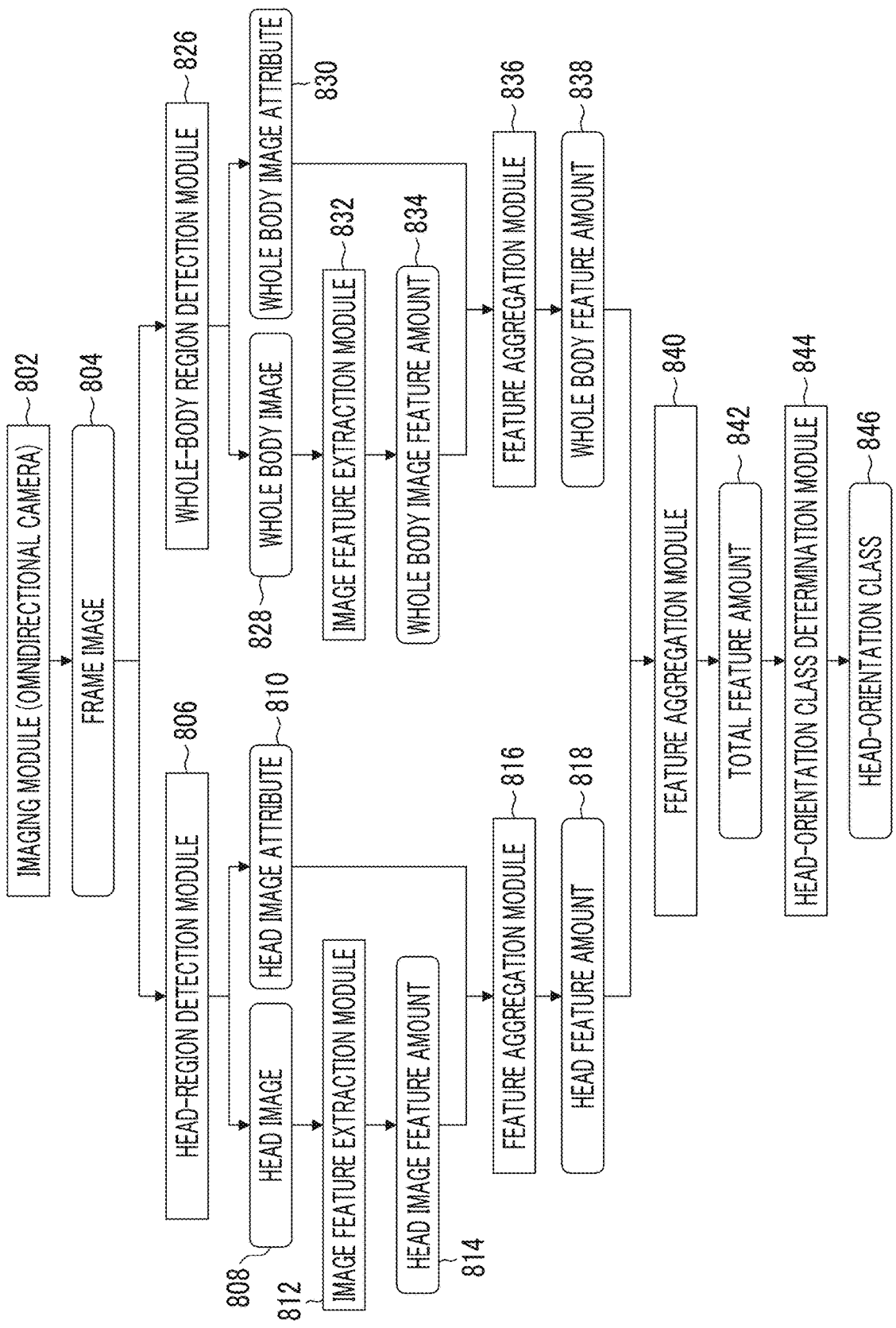
FIG. 8 is a flowchart illustrating a processing example according to the exemplary embodiment.

FIG. 8 is a flowchart illustrating a processing example according to the exemplary embodiment.

An imaging module (omnidirectional camera) 802 (corresponding to the omnidirectional camera 150) is connected to a head-region detection module 806 and a whole-body region detection module 826. The imaging module 802 transfers a frame image 804 to the head-region detection module 806 and the whole-body region detection module 826.

The head-region detection module 806 (corresponding to the first image extraction module 110 and the first position-information extraction module 120) is connected to the imaging module (omnidirectional camera) 802, an image feature extraction module 812, and a feature aggregation module 816. The head-region detection module 806 receives the frame image 804 from the imaging module (omnidirectional camera) 802, transfers a head image 808 to the image feature extraction module 812, and transfers a head image attribute (position information) 810 to the feature aggregation module 816.

The image feature extraction module 812 (corresponding to the CNN 504 and the FC 510) is connected to the head-region detection module 806 and the feature aggregation module 816. The image feature extraction module 812 receives the head image 808 from the head-region detection module 806, and transfers a head image feature amount 814 to the feature aggregation module 816.

The feature aggregation module 816 (corresponding to the FC 514 and the FC 516) is connected to the head-region detection module 806, the image feature extraction module 812, and a feature aggregation module 840. The feature aggregation module 816 receives the head image attribute 810 from the head-region detection module 806, receives the head image feature amount 814 from the image feature extraction module 812, and transfers a head feature amount 818 to the feature aggregation module 840.

The whole-body region detection module 826 (corresponding to the second image extraction module 115 and the second position-information extraction module 125) is connected to the imaging module (omnidirectional camera) 802, an image feature extraction module 832, and a feature aggregation module 836. The whole-body region detection module 826 receives a frame image 804 from the imaging module (omnidirectional camera) 802, transfers a whole body image 828 to the image feature extraction module 832, and transfers a whole body image attribute (position information) 830 to the feature aggregation module 836.

The image feature extraction module 832 (corresponding to the CNN 524 and the FC 530) is connected to the whole-body region detection module 826 and the feature aggregation module 836. The image feature extraction module 832 receives the whole body image 828 from the whole-body region detection module 826 and transfers a whole body image feature amount 834 to the feature aggregation module 836.

The feature aggregation module 836 (corresponding to the FC 534 and FC 536) is connected to the whole-body region detection module 826, the image feature extraction module 832, and the feature aggregation module 840. The feature aggregation module 836 receives the whole body image attribute 830 from the whole-body region detection module 826, receives the whole body image feature amount 834 from the image feature extraction module 832, and transfers a whole body feature amount 838 to the feature aggregation module 840.

The feature aggregation module 840 (corresponding to the FC 540) is connected to the feature aggregation module 816, the feature aggregation module 836, and a head-orientation class determination module 844. The feature aggregation module 840 receives the head feature amount 818 from the feature aggregation module 816, receives the whole body feature amount 838 from the feature aggregation module

836, and transfers a total feature amount 842 to the head-orientation class determination module 844.

The head-orientation class determination module 844 (corresponding to the FC 542) is connected to the feature aggregation module 840. The head-orientation class determination module 844 receives the total feature amount 842 from the feature aggregation module 840 and outputs a head-orientation class 846 (corresponding to the classification result 544).

Figures 9, 10:
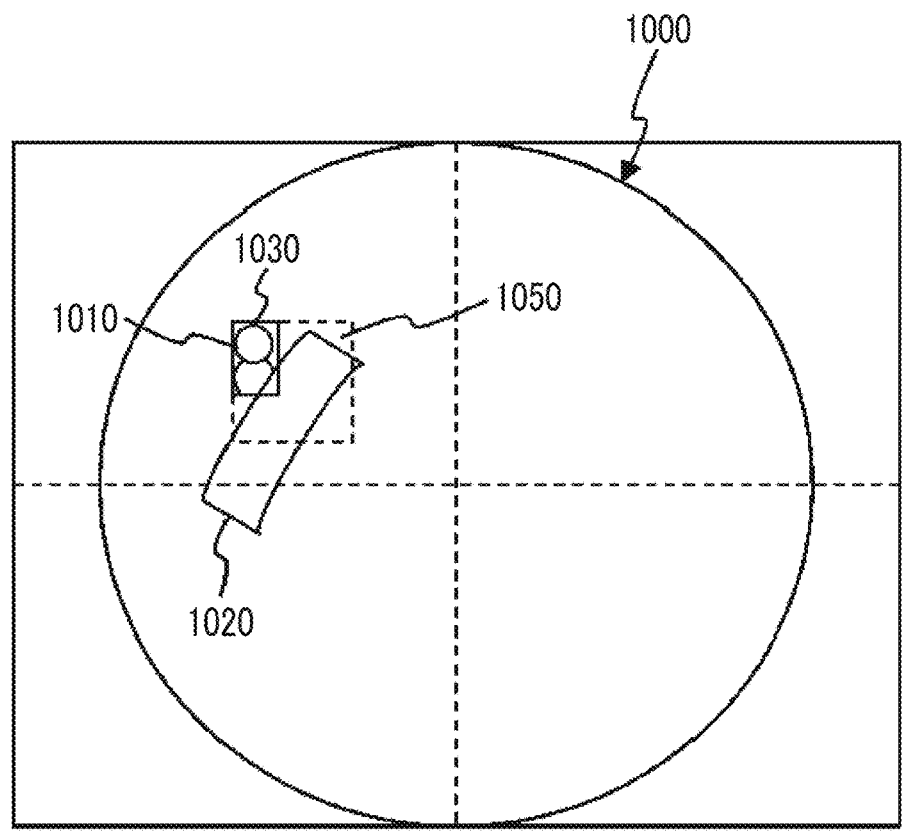
FIG. 9 is a diagram illustrating an example of an experiment result according to the exemplary embodiment.
FIG. 10 is a diagram illustrating an example of comparing a size of a person-image rectangle to a size of a threshold person-image rectangle.

FIG. 9 is a diagram illustrating an example of an experiment result according to the exemplary embodiment.

As will be described below, experiment results in a case using three combinations of images will be described.

(1) Case using only a head image
(2) Case using only a whole body image
(3) Case using the head image and the whole body image Regarding the cases, experiment results in a case where the presence or the absence of the position information is evaluated by AlexNet and VGGNet are shown as an experiment result 900.

AlexNet and VGGNet are representative methods of the convolutional neural networks and are open to the public, and thus are commonly used.

Consequently, a pattern in which the position information is provided in (3) used in the exemplary embodiment had the highest accuracy. The value (78.6) of a cell at which the line of "AlexNet Watt." intersects "(iii) head+body" in the experiment result 900 and the value (90.5) of a cell at which the line of "VGGNet w/att." intersects "(iii) head+body" show this point.

With this experiment, it was determined that a probability of belonging to each class (orientation of the face) was low in a case using only the head image, and the class was clearly classified in a case using the head image and the whole body image.

FIG. 10 is a diagram illustrating an example of comparing a size of a person-image rectangle 1030 to a size of a threshold person-image rectangle 1050.

In a case where the size of the head image or the whole body image is largely deviated from a predetermined size, it may be determined that a portion thereof is hidden, and the corresponding image may not be used. "The predetermined size" may change in accordance with the distance from the center of an omnidirectional camera image 1000.

The person image 1010 is included in the omnidirectional camera image 1000, but a portion of the imaged person is hidden by a product shelf 1020. Thus, the size of the person-image rectangle 1030 is smaller than the size of the threshold person-image rectangle 1050. The threshold person-image rectangle 1050 shows a size serving as a threshold at this position (distance from the center of the omnidirectional camera image 1000 to the person-image rectangle 1030). For example, the threshold may be a theoretical value of the image of a person at this position (for example, in a case where a person having an average height stands up, a positional relationship between the person and the omnidirectional camera 150, and the size of the person image, which has been calculated by using the distance). The threshold may be an average value of the size of person-image rectangle obtained by imaging in practice, or may be a median, the most frequent value, or the like.

The threshold person-image rectangle 1050 may have a size varying depending on the distance from the center of the omnidirectional camera image 1000. Specifically, the threshold may have a value increasing as the distance from the center becomes shorter, or may have a value decreasing as the distance from the center becomes longer.

FIGS. 11A to 11C are diagrams illustrating examples in which the omnidirectional camera image 1100 is divided into plural regions.

FIG. 11A is a diagram illustrating an example in which the omnidirectional camera image 1100 is divided into three regions (region 1120, region 1130, and region 1140). In this example, the regions are divided by the distance from the center. The omnidirectional camera image may be divided into two regions, or four regions or more.

The omnidirectional camera image 1100 may be divided into plural regions (in FIG. 11A, region 1120, region 1130, and region 1140 in accordance with the distance from the center 1110) having a donut-like shape (cylindrical shape), by the radius. Then, the regions in which any of the head image and the whole body image is used may be distinguished. Specifically, only the whole body image may be set to be used in the region 1120. The whole body image and the head image may be set to be used in the region 1130. Only the head image may be set to be used in the region 1140.

Alternatively, the weights in a case using the head image and the whole body image may be adjusted in accordance with the region to which the head image and the whole body image belong. For example, the weight of the whole body image may be set to be larger (putting a higher value on the whole body image than the head image) in the region (region 1120) close to the center 1110. The weight of the head image may be set to be larger (putting a higher value on the head image than the whole body image) in the region (region 1140) far from the center 1110. The weight of the head image may be set to increase in accordance with the distance from the center 1110 (the weight in a case of being close to the center 1110 is small, and increases with becoming farther from the center) without clearly dividing regions. Conversely, the weight of the whole body image may be set to be decreased in accordance with the distance from the center 1110 (the weight in a case of being close to the center 1110 is large, but decreases with becoming farther from the center). Specifically, learning with including the weight in the position information (position information 512 and position information 532) may be performed.

Regarding the shape of the region, in addition to the donut-like shape (cylindrical shape), as illustrated in the example in FIG. 11B, the region may be divided to have a fan-like shape. In this example, the omnidirectional camera image is divided into six regions of a region 1150, a region 1152, a region 1154, a region 1156, a region 1158, and a region 1160. In this example, the regions are divided by the position. The omnidirectional camera image may be divided into two to five regions, or seven regions or more. The weights in a case using the head image and the whole body image may be adjusted in accordance with the region.

As illustrated in the example in FIG. 11C, the region may be divided to have a rectangular shape. In this example, the omnidirectional camera image is divided into 16 regions of a region 1170 to a region 1185. The omnidirectional camera image may be divided into two to fifteen regions, or seventeen regions or more. The shape of the region may not be rectangular. The weights in a case using the head image and the whole body image may be adjusted in accordance with the region. In this case, as illustrated in FIG. 11C, the weight of the whole body image may also be set to be larger (putting a higher value on the whole body image than the head image) in the region (region 1175 and the like) close to the center 1110. The weight of the head image may also be set to be larger (putting a higher value on the head image than the whole body image) in the region (region 1170 and the like) far from the center 1110.

The shape of the region illustrated in FIGS. 11A to 11C is just an example. The region may have a shape (for example, a triangle or a hexagon) other than the above-described shape.

Figure 12:
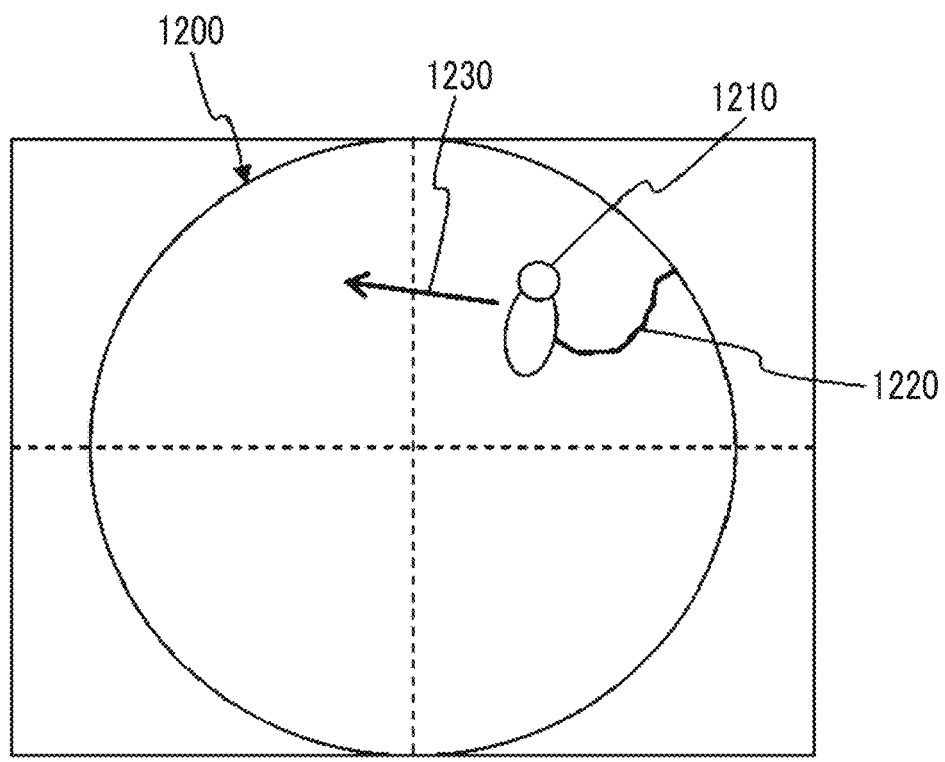
FIG. 12 is a diagram illustrating an example of a movement trajectory in the omnidirectional camera image.

FIG. 12 is a diagram illustrating an example of a movement trajectory 1220 in an omnidirectional camera image 1200.

In the above-described example, a frame image at a certain time point is used as a target. However, a parameter obtained from time-series frame images may be used. That is, the parameter is calculated by using the position of a head image or a whole body image obtained by imaging at a certain time point, and the position of a head image or a whole body image (person image 1210) obtained by imaging after that (after a predetermined time elapsed). As the parameter, for example, a speed, an acceleration, a movement trajectory 1220, a movement vector 1230, a movement distance, and combinations thereof may be used. Specifically, learning with including the parameter in the position information (position information 512 and position information 532) may be performed. It is possible to improve accuracy by adding the parameter. The weight using the parameter may be adjusted in accordance with the distance from the center and the position. For example, the weight of the parameter may increase in accordance with the distance from the center. The weight of the parameter may be set to be large at a predetermined position.

Figure 13:
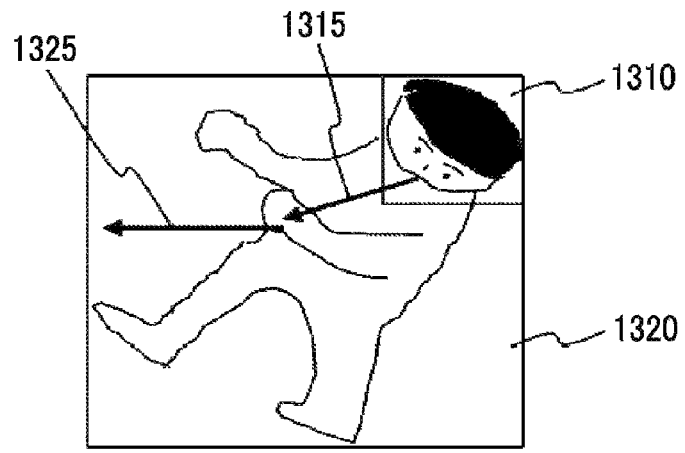
FIG. 13 is a diagram illustrating an example in which an orientation of a face is different from an orientation of a body.

FIG. 13 is a diagram illustrating an example in which an orientation 1315 of the face is different from an orientation 1325 of the body.

Different labels (directions) may be provided as the directions of a head image and a whole body image in learning data. That is, learning may be performed so as to separately estimate an orientation of the face of a person and an orientation of the person. FIG. 13 illustrates an example in which the orientation 1315 of the face in a head-image rectangle 1310 is different from the orientation 1325 of the body in a whole-body image rectangle 1320. Directions of the head image and the whole body image may be set to be identical to each other. The orientation to be estimated among the orientation of the face of a person and the orientation of the person may be adjusted in accordance with the distance from the center and the position. For example, a higher value may be put on the orientation of the person, as the distance from the center becomes closer. A higher value may be put on the orientation of the person, as the distance from the center becomes farther. The orientation to be estimated among the orientation of the face of a person and the orientation of the person may be adjusted in accordance with a predetermined position.

In a place such as the store 210, in which a product shelf is disposed, learning of a tendency of depending on the position (for example, seeing a direction of the shelf in a place close to the shelf, or a passage is easily directed to a travel direction) may be performed. That is, the position, the size, and the like of the product shelf may be included as the position information. In addition to the product shelf, a product, a poster, a mannequin, a person (for example, clerk) other than the target person, or a combination thereof may be included.

Figure 14:
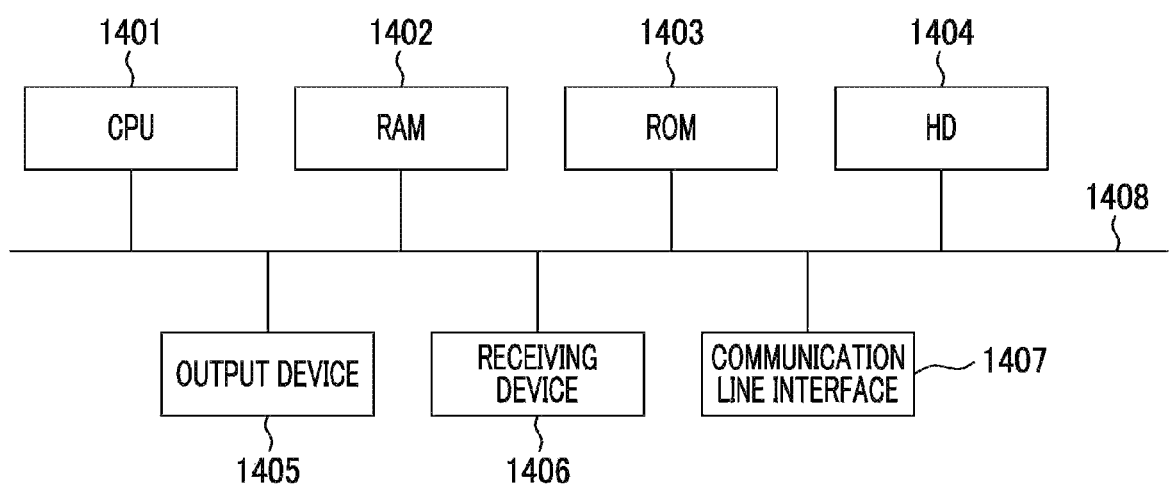
FIG. 14 is a block diagram illustrating a hardware configuration example of a computer that embodies the exemplary embodiment.

As a hardware configuration of a computer that executes a program as the exemplary embodiment, as illustrated in FIG. 14, a general computer is provided, and specifically, a personal computer, a computer which may serve as a server, and the like are provided. That is, a CPU 1401 is used as a processing unit (computation unit). A RAM 1402, a ROM 1403, and an HD 1404 are used as storage devices. As the HD 1404, for example, a hard disk, and a solid state drive (SSD) may be used. The computer includes the CPU 1401, the RAM 1402, the ROM 1403, the HD 1404, a receiving device 1406, an output device 1405 (such as a CRT, a liquid crystal display, and a speaker), a communication line interface 1407 such as a network interface card, and a bus 1408. The CPU 1401 executes programs of the image receiving module 105, the first image extraction module 110, the second image extraction module 115, the first position-information extraction module 120, the second position-information extraction module 125, the learning module 130, and the like. The RAM 1402 stores the programs or pieces of data. The ROM 1403 stores a program for operating the computer. The HD 1404 is an auxiliary storage device (may be a flash memory and the like) stores images, teaching data, a model after mechanical learning (data after learning), and the like. The receiving device 1406 receives data based on an operation (including a movement, sound, a line of sight, and the like) of a user on a keyboard, a mouse, a touch screen, a microphone, a camera (including a sight-line detection camera and the like). The communication line interface 1407 is used for being connected to a communication network. The bus 1408 connects the above-described components to each other so as to transmit and receive data to and from each other. Plural computers may be connected to each other by a network.

In the above-described exemplary embodiment, regarding the function performed by a computer program, the above-described exemplary embodiment is realized in a manner that a computer program as software is read to the system having the hardware configuration, and the software and hardware resources cooperate with each other.

The hardware configuration in FIG. 14 shows one configuration example. The exemplary embodiment is not limited to the configuration illustrated in FIG. 14. Any configuration may be made so long as the modules described in the exemplary embodiment may be performed. For example, some modules may be configured by specific hardware (for example, application specific integrated circuit: ASIC). Some modules may be in a form of being in an external system and being connected to each other by a communication line. Further, plural systems of which each is illustrated in FIG. 14 may be connected to each other by a communication line so as to operate in cooperation with each other. In particular, in addition to a personal computer and a computer which may serve as a server, the above-described exemplary embodiment may be incorporated in a robot, a copier, a facsimile machine, a scanner, a printer, a multifunction device (image processing apparatus having two or more functions of a scanner, a printer, a copier, and a facsimile machine).

The described program may be provided in a form of being stored in a recording medium. In addition, the program may be provided by communication means. In this case, for example, the above-described program may be regarded as an invention of "a computer readable recording medium recording a program".

"The computer readable recording medium recording a program" refers to a computer readable recording medium which is used for installing, executing, distributing, and the like of a program and in which the program has been recorded.

Examples of the recording medium include a digital versatile disk (DVD), "a DVD-R, a DVD-RW, a DVD-RAM, and the like" being standards formulated in the DVD forum, "a DVD+R, a DVD+RW, and the like" being standards in the DVD+RW, a compact disk (CD), a read only memory (CD-ROM), a CD recorder (CD-R), a CD rewritable (CD-RW), a Blu-ray (registered trademark) disc, a magneto-optical disk (MO), a flexible disk (FD), a magnetic tape, a hard disk, a read only memory (ROM), an electrically erasable and programmable read only memory (EEPROM (registered trademark)), a flash memory, a random access memory (RAM), and a secure digital (SD) memory card.

The entirety or a portion of the program may recorded in the recording medium and then be preserved, distributed, or the like. The program may be transmitted by a communication with a transmission medium (for example, a wired network (used in a local area network (LAN), a metropolitan area network (MAN), a wide area network (WAN), the Internet, an intranet, an extranet, and the like), a wireless communication network, or a combination thereof). The program may be carried on a carrier wave.

The program may correspond to a portion or the entirety of another program. The program may be recorded in a recording medium along with an individual program. The program may be divided and recorded in plural recording media. The program may be recorded in any form such as compression and encryption, so long as restoration is possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor, configured to:
receive a first image which has been extracted from an image obtained by imaging of an omnidirectional camera, the first image having been obtained by imaging a head of a person and position information indicating a position of the person in the image;
calculate a degree of distortion of the first image from the position information; and
perform learning for estimating an orientation of a face of the person by using the calculated degree of distortion and the first image,
wherein when a size of the first image is greater than a predetermined threshold, perform learning for estimating the orientation of the face of the person,
wherein the predetermined threshold is changed in accordance with a distance between a center of the image and the position of the person in the image.

2. The information processing apparatus according to claim 1,
wherein an coordinate position of the person which is defined based on a specific point in the image, a distance from a specific point to the person, or a combination thereof is used as the position information.

3. The information processing apparatus according to claim 2,
wherein a size of the person, a ratio between a horizontal length and a vertical length of a rectangle surrounding the person, or a combination thereof is further used as the position information.

4. The information processing apparatus according to claim 3,
wherein the hardware processor further receives third position information indicating a position of an object other than the person, in the image, and
performs the learning by further using the third position information.

5. The information processing apparatus according to claim 4,
wherein the object other than the person is a product shelf, a product, a poster, a mannequin, a person other than the person, or a combination thereof.

6. A non-transitory computer readable medium storing an information processing program causing a computer to function as:
receiving a first image which has been extracted from an image obtained by imaging of an omnidirectional camera, the first image having been obtained by imaging a head of a person and position information indicating a position of the person in the image;
calculating a degree of distortion of the first image from the position information; and
performing learning for estimating an orientation of a face of the person by using the calculated degree of distortion and the first image,
wherein when a size of the first age is greater than a predetermined threshold, performing learning for estimating the orientation of the face of the person,
wherein the predetermined threshold is changed in accordance with a distance between a center of the image and the position of the person in the image.

* * * * *